United States Patent [19]

Höfer et al.

[11] 4,246,832
[45] Jan. 27, 1981

[54] CONTROL ARRANGEMENT FOR A HYDRAULIC FORCE TRANSMISSION

[75] Inventors: Wolfgang Kötter, Mörkgröningen; Friedrich-Wilheim Höfer, Ditzingen; Günther Schwerin, Möglingen, all of Fed. Rep. of Germany

[73] Assignee: Robert Bosch GmbH, Stuttgart, Fed. Rep. of Germany

[21] Appl. No.: 6,502

[22] Filed: Jan. 25, 1979

[30] Foreign Application Priority Data

Mar. 10, 1978 [DE] Fed. Rep. of Germany ....... 2810375

[51] Int. Cl.³ .......................................... F15B 11/10
[52] U.S. Cl. ........................................ 91/444; 91/461
[58] Field of Search ............... 91/444, 445, 443, 461; 137/249, 528, 529, 624.18, 625.25, 625.33, 625.48, 596

[56] References Cited

U.S. PATENT DOCUMENTS

| 3,625,004 | 12/1971 | Holzbock | 91/444 X |
| 3,903,786 | 9/1975 | Walters | 91/444 |
| 4,007,666 | 2/1977 | Bauer | 91/444 |
| 4,065,922 | 1/1978 | Ott | 91/444 X |

Primary Examiner—Edward J. McCarthy
Attorney, Agent, or Firm—Michael J. Striker

[57] ABSTRACT

A control arrangement for a hydraulic force transmission, especially for a hydraulically operated lifting device on agricultural vehicles comprises, besides a main control slide, a pressure control slide and a blocking device, an auxiliary slide arranged in a bore of the pre-control slide. The hydraulic working fluid is fed from the main slide directly to the blocking device and a special arrangement of the auxiliary slide in the hydraulic control circuit permits a compact and simple construction of the control arrangement, while preventing tight throttling of the fluid in either direction of the flow.

12 Claims, 3 Drawing Figures

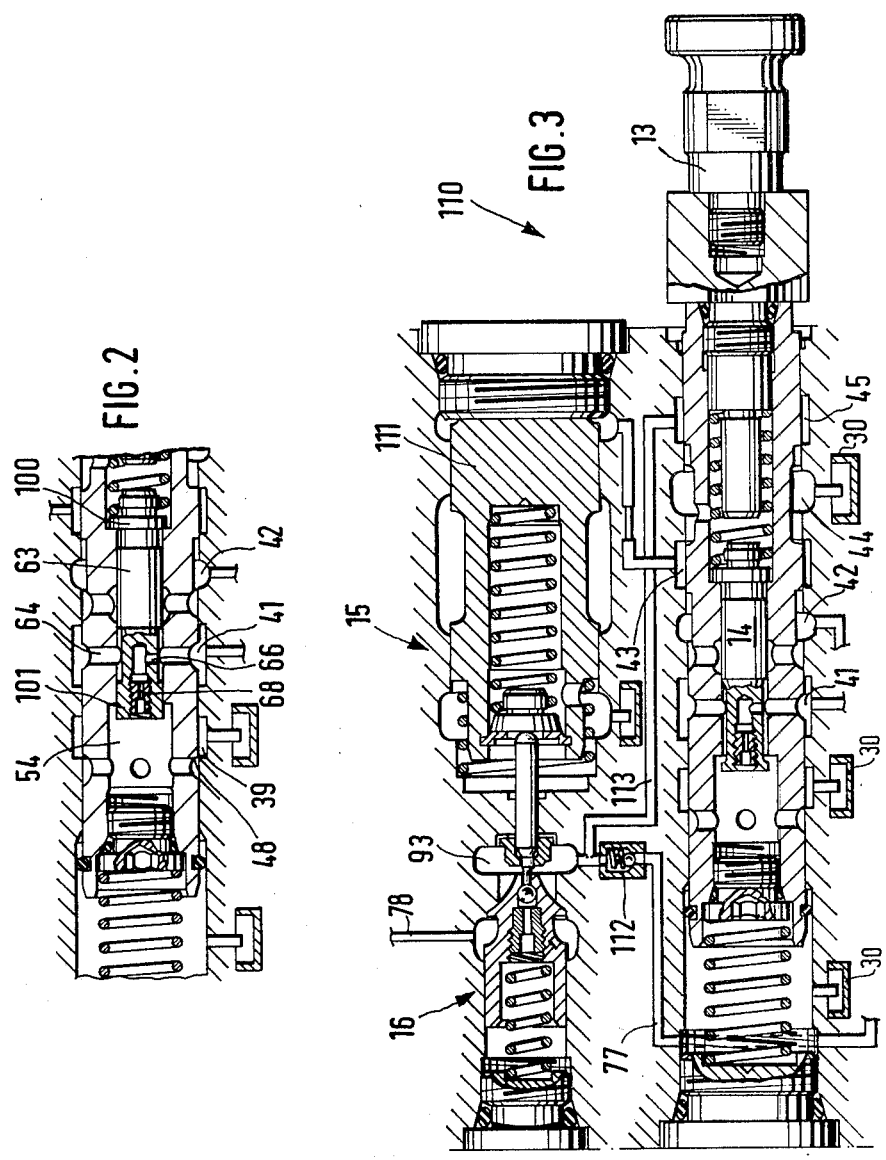

4,246,832

CONTROL ARRANGEMENT FOR A HYDRAULIC FORCE TRANSMISSION

BACKGROUND OF THE INVENTION

The present invention relates to a control arrangement for a hydraulic force transmission to be used especially for a hydraulically operated load lifting and lowering device on agricultural vehicles. Such control arrangements are known in the art in which hydraulic fluid under pressure from a pump is transmitted over a precontrol slide and a blocking device to the hydraulically operated load lifter, whereby the precontrol slide controls the main control slide of the arrangement. In this arrangement it is necessary that the main control slide, the precontrol slide and the blocking device are dimensioned for the large working fluid stream. This prevents a compact construction. In addition, this known arrangement has a relatively long pressure channel for the operating pressure fluid, which leads to an increased flowthrough resistance. Furthermore, in this known arrangement the auxiliary slide forms part of a four-port-two-position valve which is relatively complicated. Since in this known arrangement a continuous control oil stream flows in the neutral position of the arrangement over the auxiliary slide, the latter can also not build too small which again prevents a compact construction. Furthermore, the continuous control oil stream produces additional energy losses. With this known arrangement, the relief of a control chamber coordinated with the main control slide is also influenced by the auxiliary slide. Thereby a certain movement of the auxiliary slide shall assure that there will never occur such a throttling operation that the amount of oil delivered by the pump can just pass through a release opening at the prevailing pressure relationships, so that the pump has to work against an unnecessarily high pressure. This procedure, called for short "tight throttling", may quickly lead to a destruction of the pump. While with the known control arrangement such "tight throttling" is prevented during the pressure increase phase, that is during shifting of the precontrol slide from the neutral position to the lifting position, it is possible that during reverse shifting of the precontrol slide conditions may occur which will result in tight throttling, which evidently is of considerable disadvantage. An additional disadvantage of the known arrangement is that various dimensions of bores and control edges with respect to each other are critical. A further disadvantage of this known arrangement is that during an eventual loading of the fluid stream which is passed from the main control slide into the return conduit, by an additional consumer in the return conduit and by simultaneous lowering of the load of the first consumer, a pressure can be created in the blocking device which leads to a damage of the same.

SUMMARY OF THE INVENTION

It is an object of the present invention to provide a control arrangement for a hydraulically operated load lifting device which avoids the disadvantages of such arrangements known in the art.

It is an additional object of the present invention to provide a control arrangement of the aforementioned kind which can be constructed in a more compact manner than known control arrangements of this kind.

It is a further object of the present invention to provide a control arrangement in which the aforementioned tight throttling is positively prevented during movement of the precontrol slide in either direction.

With these and other objects in view, which will become apparent as the description proceeds, the arrangement for controlling the flow of hydraulic fluid under pressure to and from a hydraulic consumer, especially a hydraulically operated load lifter, mainly comprises a housing formed with two bores therethrough, a main control slide axially movable in one of the bores, a precontrol slide axially movable in the other of said bores, in which the precontrol slide is provided with an axial bore closed at opposite ends and an auxiliary slide axially movable in the aforementioned axial bore as a control slide, blocking means in the housing between the precontrol slide and the consumer and controlled by the precontrol slide, the one bore being closed at opposite ends forming between one of the closed ends and the facing end of the main control slide a spring chamber, the other bore in the housing forming about the precontrol slide an inlet chamber, a return chamber and a control chamber located between the aforementioned two chambers, the precontrol slide having a first control edge controlling flow of fluid between said control chamber and the return chamber and a second control edge controlling flow of fluid between the control chamber and the inlet chamber, the bore in the control slide forming between one of the closed ends and said auxiliary slide a pressure chamber, a passage through the auxiliary slide connecting the control chamber with the pressure chamber, a throttle in this passage, a source of fluid under pressure, a pressure channel leading from the main control slide directly to the blocking means, and connectable by the main control slide to the source, a return conduit, and control passage means leading from the source over the precontrol slide and the auxiliary slide to the aforementioned spring chamber and connectable by the main control slide to the return conduit, the second control edge forming a throttle passage in the control passage means and the latter connecting the control chamber with the spring chamber, whereas the auxiliary slide controls a bypass leading from the inlet chamber to the control chamber, which bypass being parallel to the passage leading over the second control edge and parallel to the passage in which the throttle is located.

The pressure chamber communicates with the control chamber in either position of the auxiliary slide only over the aforementioned throttle, which will assure a damping of the movement of the main control slide during its movement from a position initiating lifting of a load to its neutral position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a partial cross-section through another auxiliary slide; and

FIG. 3 is a longitudinal cross-section through part of another control arrangement.

DESCRIPTION OF THE PREFERRED EMBODIMENTS

Figure 1:
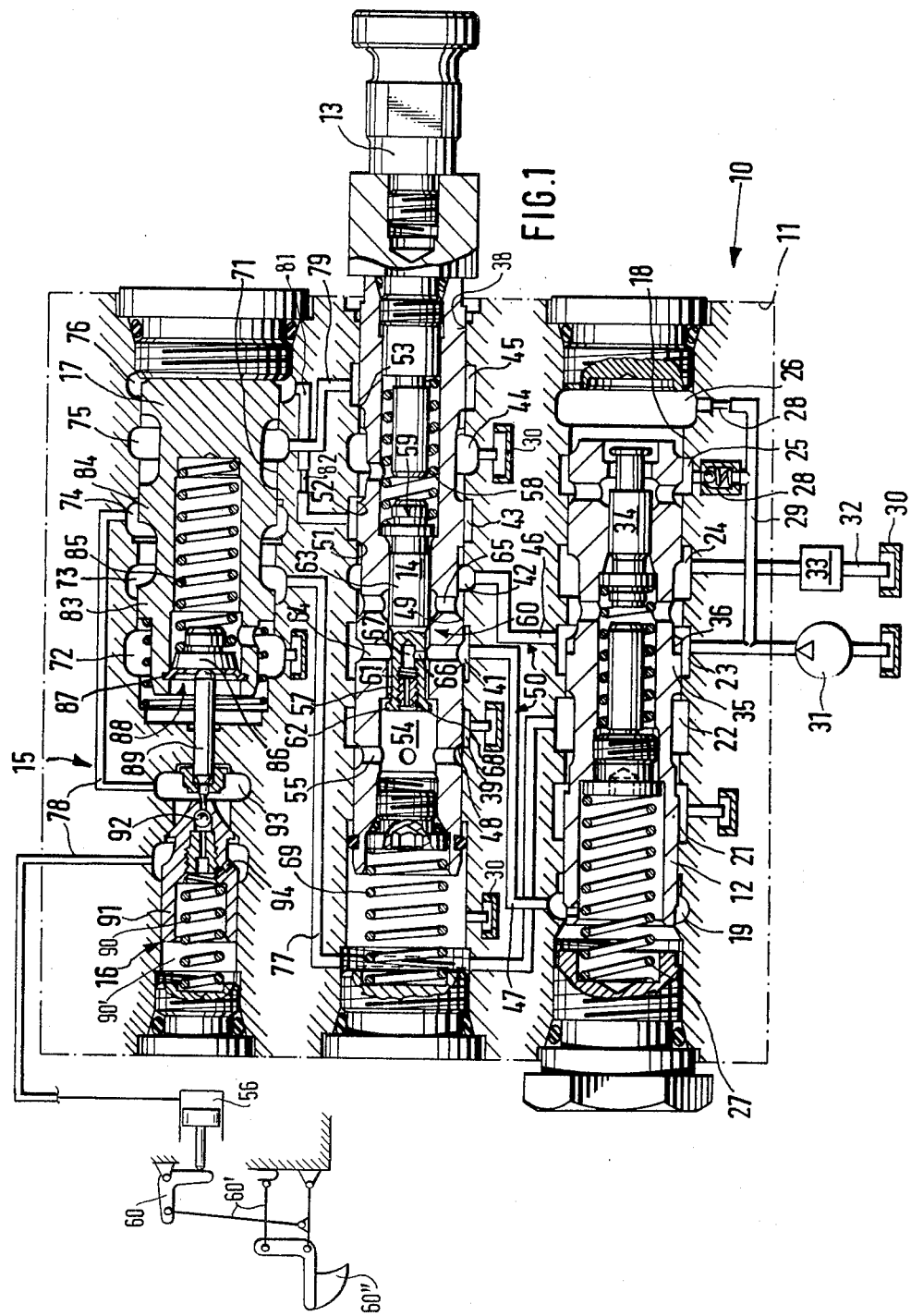
FIG. 1 is a schematic longitudinal cross-section through the control arrangement according to the present invention, with the various elements of the control arrangement shown in neutral position.

Referring now to the drawing and more specifically to FIG. 1 of the same, there is shown a control arrangement 10 to be used as control arrangement for a hydraulically operated lifting device of agricultural vehicles, especially tractors or combines.

The control device 10 is provided with a housing 11 in which in corresponding bores a main control slide 12, a precontrol slide 13 with an auxiliary slide 14 arranged therein, as well as a blocking device 15 comprising a valve 16 and a pushing piston 17, are arranged parallel to each other.

The main control slide 12 is axially guided in a bore 18 which is formed with adjacent annular enlargements forming, starting from the region of the left end of the bore 18, a spring compartment 19, a discharge compartment 21, an outlet compartment 22, an inlet compartment 23, a run-on compartment 24 and damping compartments 25 and 26. The main control slide 12 is loaded at one end by spring 27 arranged in the spring compartment 19, as well as from the fluid pressure prevailing in the spring compartment 19, and on the other end by the fluid pressure prevailing in the damping compartment 26. The damping compartments 25 and 26 are connected by a channel 29 and over a one-way valve 28 with the inlet compartment 23. The inlet compartment 23 is connected by a conduit with the pump 31, and from the run-on compartment 24 a conduit 32 leads, over an additional consumer 33 located therein, to the tank 30. A damping slide 34 is arranged in an axial bore of the main control slide 12, which controls the connection between the damping compartments 25 and 26 and the position of the damping slide 34 is controlled depending on the pressures residing on opposite ends thereof. The control flow of the fluid stream under pressure is pumped by the pump 31 from the inlet compartment 23 selectively into the run-on compartment 24 or the outlet compartment 22, the main control slide 12 has a piston section 35 with a fine control chamber 36.

The precontrol slide 13 is arranged in a second bore 38 extending parallel to the bore 18. The bore 38 is again provided with a plurality of adjacent annular enlargements forming, starting from the left end of the bore 38 as viewed in the drawing, a first return chamber 39, a first control chamber 41, an inlet chamber 42, a second control chamber 43, a second return chamber 44 and a third return chamber 45. The first return chamber 39 and the second return chamber 44 are relieved toward the tank 30. The inlet chamber 42 is connected by an inlet channel 46 with the inlet compartment 23 at the main control slide 12, whereas a control channel 47 leads from the first control chamber 41 to the spring compartment 19 of the main control slide 12. The inlet channel 46 and the control channel 47 form part of a control conduit system 50 which leads from the pump 31 to the return conduit and in which the precontrol slide 13, the auxiliary slide 14, and the spring compartment 19 are arranged. Annular grooves provided on the peripheral surface of the precontrol slide 13 form thereon five control edges 48, 49, 51, 52 and 53, of which the first control edge 48 controls the connection from a pressure chamber 54 formed in the precontrol slide 13 over radial bores 55 to the first return chamber 39. The second control edge 49 controls the connection from the inlet chamber 42 to the first control chamber 41. The third control edge 51 and the fourth control edge 52 control the connections from the second control chamber 43 to the inlet chamber 42, respectively to the second return chamber 44. The fifth control edge 53 throttles, during lowering of a load of a hydraulically operated load lifter 56, the lowering speed. The load lifter 56 is schematically shown in FIG. 1 as a fluid operated cylinder and piston unit, and the piston rod of the piston in the cylinder of the unit abuts against a crank lever 60 which is connected to a linkage 60' having an arm carrying a plow 60" which is to be lifted during feeding of pressure fluid into the cylinder of the unit and which is to be lowered during outflow of such pressure fluid from the unit. The first and second control edges 48 and 49 are so arranged and dimensioned that they will provide a positive overlapping and in addition they work in opposite directions. From the pressure chamber 54 in the precontrol slide 13 a coaxial bore leads to a space in which a coil spring 58 is arranged, which biases an auxiliary slide 14 guided in the longitudinal bore 57 toward the left, as viewed in the drawing. The auxiliary slide 14 forms part of a three-port, two-position valve 59 and serves to prevent the above-mentioned so-called "tight throttling." An elongated annular groove 61 divides the auxiliary slide 14 in an end section 62 and a piston section 63 and the control edges of these two sections are likewise constructed with positive overlapping. In the illustrated starting position of the auxiliary slide 14, the end section 62 controls the connection from the pressure chamber 54 over the groove 61 to the radial bores 64 which, independent of the respective position of the precontrol slide 13, are always in connection with the first control chamber 41. At the same time the piston section 63 closes in the illustrated starting position of the auxiliary slide 14 the radial bores 65 which lead into an annular groove on the peripheral surface of the precontrol slide 13 adjacent the second control edge 49 thereof and which is always connected with the inlet chamber 42. A connection parallel to the connection controlled by the end section 62 leads from the first control chamber 41 over a cross bore 66 in the region of the groove 61, an axial bore 67 as well as a throttle 68 to the pressure chamber 54. The precontrol slide 13 is biased by a spring 69 toward the right, as viewed in FIG. 1, and is actuated against the pressure of the spring 69 by a non-illustrated regulating linkage acting on the right end of the precontrol slide 13 projecting beyond the housing 11. The auxiliary slide 14 controls with its piston section 63 a connection from the inlet chamber 42 to the control chamber 41, which is designated as bypass 60 and which is parallel to the connection over the second control edge 49 and also parallel to the throttle 68.

The opening piston 17 of the blocking device 15 is slidably arranged in a bore 71 of the housing 11 and the bore is formed with a plurality of adjacent annular enlargements forming, starting from the left end of the bore 71, a return space 72, an annular inlet space 73, an annular consumer space 74, an annular lowering space 75, as well as an annular control space 76. A pressure channel 77 leads from the inlet space 73 directly to the outlet compartment 22 on the main control slide 12. The housing 11 is preferably formed by a cylindrical casting and the aforementioned connection is in practice advantageously formed by a short cross channel in the casting. A consumer conduit 78 leads from the consumer space 74 over the valve 16 to the load lifter 56. The lowering space 75 is connected by a passage 79 with the third return chamber 45 at the precontrol slide 13. A channel 81 provided with a throttle 82 leads from the control space 76 into the second control chamber 43 at the precontrol slide 13. The return space 72 is relieved of pressure by being connected to the tank 30. The opening piston 17 is provided on the peripheral surface thereof with a first control land 83 and a second control land 84. A spring 85 arranged in a coaxial blind bore of the piston 17 presses a piston 86 in this blind bore against an abutment 87 and forms thereby a force limiting arrangement 88. The piston 86 abuts against one end of a plunger 89 which is guided for movement in axial direction in the housing 11 and which cooperates with the valve member 91 of the valve 16, which in turn is already precontrolled by means of a ball valve 92 arranged in the interior thereof. The valve member 91 separates in the illustrated starting position, in which it is held by a spring 90 in a spring chamber 90', a first chamber 93 at the inlet side of the valve 16 from a second chamber 94 arranged at the outlet side of this valve.

The action of the control arrangement 10 is described in the following, insofar as it is necessary for the understanding of the invention.

In the shown neutral starting position of the precontrol slide 13, the main control slide 12 is in the illustrated position. In this position the main control slide 12 controls the flow of oil pumped by the pump 31 into the inlet compartment 23 over the fine control chamber 36 into the run-on compartment 24 and to the auxiliary consumer 33 in the conduit 32 to the tank 30. A pressure difference will thereby be created from the inlet compartment 23 to the run-on compartment 24, since the pump pressure in the damping compartment 26 has to balance the force of the springs 27. The spring chamber 19 itself is relieved of pressure over the auxiliary slide 14, the first control edge 48, of the precontrol slide 13 towards the tank 30, since the auxiliary slide 14 has the illustrated starting position and therefore does not close the control passage system 50 to the tank, nor does it throttle this system. The flow of fluid to the load lifter 56 is prevented in the shown neutral position by the valve 16. The consumer space 74 of the opening piston 17 is relieved of pressure over the pressure channel 77, the outlet compartment 22, the discharge compartment 21 towards the tank 30. At the same time pressure in the control space 76 is relieved over the channel 81, the first control chamber 43 and the second control chamber 44 to the tank 30. The control pressure residing due to the pressure gradient in the inlet chamber 42 can, therefore, not lead, due to leaking control oil, to an undesired actuation of the opening piston 17.

In order to produce a lifting movement of the load lifter 56 by feeding pressure fluid to the right side of the piston located therein, the precontrol slide 13 is moved against the force of the spring 69 towards the left, as viewed in the drawing, into a lifting position. Thereby the first control edge 48 of the precontrol slide 13 closes the connection to the tank 30 and interrupts the control conduit system 50 leading from the spring compartment 19 to the tank 30. Subsequently thereto the second control edge 49 opens the connection between the inlet chamber 42 to the first control chamber 41 and the control oil flows over the control channel 47 into the spring compartment 19. The thus pressure balanced main control slide 12 is moved by the spring 19 toward the right, as viewed in the drawing, and throttles thereby the flow of oil through the return conduit 32 to the consumer 33. This movement of the main control slide 12 toward the right occurs in the beginning without dampening, and is during its further movement damped when the pressure dependent damping slide 34 reverses. At the mentioned movement of the main control slide 12 towards the right, it separates first the outlet compartment 22 from the discharge compartment 21 and then connects the outlet compartment 22 with the inlet compartment 23. Oil from the inlet compartment 23 can now pass over the pressure channels 77 into the inlet space 73 and further over the consumer space 74 at the opening piston 17, the consumer conduit 78 and the valve 16 which operates now as a one-way valve to the load lifter 56, which thus lifts the load connected thereto.

A so-called "tight throttling" is avoided during this lifting process. This tight throttling is known per se for instance from the German Auslegeschrift No. 1,928,896 and designates such a throttling process in which the oil pumped by the pump can just pass through a relief bore at the prevailing pressure conditions, whereby the pump has to work against an exceedingly high pressure and is thereby quickly destroyed. This tight throttling is prevented with the arrangement according to the present invention, due to the sudden movement of the main control slide 12 so that the same may not remain stationarily in an undesired manner in an intermediate position. A creeping approach to an undesired condition of equilibrium is thereby positively prevented. This is obtained by means of the auxiliary slide 14 which acts as a hydraulic snap-switch and controls the bypass 60 in the control conduit system 50. When the first control edge 48 at the precontrol slide 13 closes relief of the control conduit 50 and subsequently thereto the second control edge 59 opens the connection coordinated therewith, the pressure prevailing in the first control chamber 41 may also build up over the radial bore 64, the annular groove 61 on the auxiliary slide 14 in the pressure chamber 54. If the pressure in the latter rises to a predetermined volume, depending on the pressure rise in the inlet compartment 23, then the auxiliary slide 14 snaps over from the shown starting position toward the right to its other end position. Thereby the piston section 63 opens the bypass 60 from the inlet chamber 42 to the first control chamber 41, while the end section 62 closes the connection over the annular groove 61 to the pressure chamber 54. The bypass 60 is, therefore, parallel to the connection over the second control edge 49. The still increasing pressure in the first control chamber 41 may pass at the reversed auxiliary slide 14 over the cross bore 66, the bore 67 and the throttle 68 in the auxiliary slide 14 into the pressure chamber 54 to hold thereby the auxiliary slide 14 securely against the force of the spring 58 in its right end position. Thus, during shifting of the precontrol slide from the neutral to the lifting position a so-called tight throttling is positively prevented, whereby the auxiliary slide 14 operates as a so-called pressure monitor.

If, after the lifting process has been finished, the precontrol slide is again moved from its lifting position to its neutral position, then the so-called "tight throttling" is again prevented by the fast movement of the auxiliary slide 14. During the start of the movement of the precontrol slide 13 towards the right to its neutral position, the second control edge 49 interrupts flow of fluid through the fluid passage system 50, whereas the bypass 60 still remains open. Subsequently thereto, the first control edge 48 opens the connection of the pressure chamber 54 to the tank 30, whereby the pressure in the pressure chamber 54 drops. Only a very small amount of control oil can flow over the throttle 68 from the spring compartment 19 into the pressure chamber 54. If the pressure in the pressure chamber 54 sinks below a predetermined value, then the spring 58 presses the auxiliary slide 14 back into the illustrated starting position, whereby the bypass 60 will be closed. The pressure in the spring compartment 19 is now relieved toward the tank 30 so that the pressure acting in the damping compartment 26 moves the main control slide from its right end position again toward the illustrated middle position in which the connection between the inlet compartment 23 and the run-on compartment 24 is again established. Thus a "tight throttling" is also prevented during such movement due to the sudden reversal of the movement of the auxiliary slide 14 in connection with the oppositely open, respectively closed throttle location in the control circuit. This is advantageously derived in that the auxiliary slide works thereby as a fluid regulating slide which is, however, so arranged that it throttles the fluid stream to an increasing pressure gradient.

In order to lower the load connected to the load lifter 56, that is in order to permit outflow of the fluid from the cylinder compartment to the right side of the piston of the load lifter 56, the precontrol slide 13 is moved from the shown neutral position toward the right into a load lowering position. Thereby the precontrol slide 13 opens with its third control edge 51 the connection from the inlet chamber 42 over the second control chamber 43 and the conduit 81 to the control space 76 at the right end of the opening piston 17 and interrupts at the same time by its fourth control edge 52 flow of fluid from the control space 76 to the tank 30. The control pressure now obtained in the control space 76 presses the piston 17 towards the left, as viewed in the drawing, into another end position. Thereby the plunger 89 opens the precontrolled valve 16 and oil from the cylinder space at the right side of the piston in the load lifter 56 flows now back through the consumer conduit 78 into the consumer space 74, further to the lowering space 75, over the conduit 79 into the third return chamber 45 and from there into the second return chamber 44 to the tank 30. Thereby the return flow may be throttled in any desired manner by fine control chambers provided on the precontrol slide 13. During this lowering operation the control pressure throttled by the main control slide 12 is sufficient for actuating the opening piston 17.

If, however, during the above-described lowering procedure the consumer 13 in the outlet conduit 32 is actuated at the same time, so that in the run-on compartment 24 as well as in the inlet compartment 23 a much higher pressure will occur than the otherwise necessary control pressure, then this higher pressure will act also in the control space 76 onto the opening piston 17. The above-described force limiting arrangement 88 will prevent that an exceedingly large force will be transmitted to the plunger 89, which could lead to a destruction of elements of the blocking arrangement 15.

FIG. 2 shows part of the precontrol slide 13 with a different auxiliary slide 100 arranged therein. The auxiliary slide 100 differs from the auxiliary slide 14 shown in FIG. 1 only in that a wider end section 101 is provided, which also in its starting position closes the unthrottled connection from the first control chamber 41 to the pressure chamber 54, whereby an especially efficient and advantageous damping of the main control slide 12 during its movement from the position "lifting" to the position "neutral" may be obtained, while practically no additional means are necessary. By this movement from the lifting position to the neutral position the main control slide 12 has to displace pressure fluid from the spring compartment 19. This control oil flows from the spring compartment 19 over the control channel 47, the first control chamber 41, the radial bore 64 in the precontrol slide 13, the bore 66, 67 in the auxiliary slide 14 and the throttle 68 into the pressure chamber 54 and over the first control edge 48 to the tank 30. Due to the considerable throttling at the throttle 68 oscillations of the main control slide 12 are positively prevented and an overmovement beyond the neutral position is prevented, even though a relative high pressure in the damping compartments 25, respectively 26, acts on the main control slide 12.

FIG. 3 illustrates part of a modified control arrangement 110, which differs from that shown in FIG. 1 especially by a simpler opening piston 111. In this arrangement the pressure channel 77 leads directly into the chamber 93 at the inlet side of the valve 16. Outflow of fluid from the chamber 93 through the pressure channel 77 is prevented by a one-way valve 112 located therein. A passage 113 connected to the pressure channel 77 between the one-way valve 112 and the chamber 93 leads to the third return chamber 45 at the precontrol slide 13. The annular spaces 73, 74 and 75 shown in FIG. 1 about the closer piston 17 are omitted in the construction shown in FIG. 3.

The operation of the embodiment shown in FIG. 3 is similar to that shown in FIG. 1. During the lifting operation pressure fluid passes over the pressure channel 77 and the valve 16 directly to the load lifter 56, not shown in FIG. 3. The channel 113 is thereby blocked by the precontrol slide 13. During the lowering operation outflow of fluid from the load lifter 56 through the pressure channel 77 is prevented by the one-way valve 112 and the oil will flow from the load lifter 56 over the opened valve 16, the channel 113, the third return chamber 54 and the second return chamber 44 to the tank 30. The control arrangement 110 has the advantage that it is simpler in construction than the control arrangement 10 and that it also permits a quicker changeover from the position "lifting" to the position "lowering" and vice versa.

It will be understood that each of the elements described above, or two or more together, may also find a useful application in other types of control arrangements for a hydraulic force transmission differing from the types described above.

While the invention has been illustrated and described as embodied in an arrangement for controlling flow of hydraulic fluid under pressure to and from a hydraulic consumer, especially a hydraulically operated load lifter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for controlling the flow of a hydraulic fluid under pressure to and from a hydraulic consumer, especially a hydraulically operated load lifter, a combination comprising a housing formed with two bores therethrough; a main control slide axially movable in one of said bores; a precontrol slide axially movable in the other of said bores, said precontrol slide being provided with an axial bore closed at opposite ends; an auxiliary slide axially movable in said axial bore of said precontrol slide; blocking means in said housing between said precontrol slide and the consumer and controlled by said precontrol slide; said one bore in said housing being closed at opposite ends and forming between one of said closed ends and the facing end of the main control slide a spring compartment; the other bore in said housing forming about said precontrol slide an inlet chamber, a return chamber and a control chamber located between said inlet chamber and said return chamber, said precontrol slide having a first control edge controlling flow of fluid between said control chamber and said return chamber and a second control edge controlling flow of fluid between said control chamber and said inlet chamber, said bore in said precontrol slide forming between one of the closed ends thereof and said auxiliary slide a pressure chamber; a passage through said auxiliary slide connecting said control chamber with said pressure chamber; a throttle in said passage; a source of fluid under pressure; a pressure channel leading from said main control slide directly to said blocking means and connectable by said main control slide to said source; a return conduit; control passage means leading from said source over said precontrol slide and said auxiliary slide to said spring chamber and connectable by said main control slide to said return conduit, said second control edge forming a throttle passage in said control passage means and said control passage means connecting said control chamber with said spring chamber, said auxiliary slide controlling a bypass leading from the inlet chamber to said control chamber, said bypass being parallel to the passage leading over the second control edge and parallel to the passage in which said throttle is located.

2. A combination as defined in claim 1, wherein said auxiliary slide is axially movable between a starting position and a second position and is arranged and constructed so as to close said bypass in said starting position and to open said bypass in said second position, passage means in said auxiliary slide for connecting in said starting position said control chamber with said pressure chamber, and including spring means biasing said auxiliary slide to said starting position.

3. A combination as defined in claim 1, wherein said pressure chamber communicates with said control chamber in either position of the auxiliary slide only over said throttle.

4. A combination as defined in claim 2, wherein said auxiliary slide has a first end section having a control edge at one end of said passage means in said auxiliary slide and a second end section axially spaced from said first end section and having a second control edge at the other end of said passage means, said first control edge opening in said starting position of said auxiliary slide the connection between said control chamber and said pressure chamber and closing in said second position said connection, said second control edge closing in said starting position said bypass and opening in said second position said bypass, said first and second control edges being axially spaced from each other a distance such that, as the auxiliary slide moves from the starting to said second position, said connection between said control chamber and said pressure chamber is closed before said bypass is opened and that, as the auxiliary slide moves from said second to said starting position, said connection is opened before said bypass is closed.

5. A combination as defined in claim 4, wherein said passage means in said auxiliary slide comprises an annular groove between said first and said second control edge and including a blind axial bore having an open end communicating with said pressure chamber and a radial bore between said axial bore and said groove, said throttle being located in one of said bores in the auxiliary slide.

6. A combination as defined in claim 5, wherein said precontrol slide is provided in the region of said inlet chamber with radial bores, one of the control edges of the precontrol slide controlling flow of fluid between said inlet chamber and said control chamber and the other of said control edges of said auxiliary slide being coordinated with said radial bores.

7. A combination as defined in claim 1, wherein said one bore forms about said main control slide an inlet compartment connected with said source, an outlet compartment to one side of said inlet compartment connected to said pressure chamber, and a further compartment at the other side of said inlet compartment, said main slide having a slide section controlling flow of fluid from said inlet compartment to the compartment at either side of said inlet compartment.

8. A combination as defined in claim 7, wherein said housing is provided with two additional axially spaced bores aligned along a common axis, and wherein said blocking means comprises an opening piston slidably guided in one of said additional bores and a valve member slidably guided in the other of said additional bores, said other of said additional bores being provided with a first chamber at the inlet side of said valve member and a second chamber at the outlet side thereof, said valve member being movable between a starting position in which flow of fluid between said first and said second chamber is prevented and a second position permitting flow between said chambers, and including spring means biasing said valve member to said starting position, said opening piston cooperating with said valve member for moving the latter from said starting to said second position, said one additional bore being formed with an annular inlet space, an annular consumer space, and an annular load lowering space axially spaced from each other and extending about said opening piston, said other bore being provided with a second and a third return chamber about said precontrol slide, said pressure channel leading from said outlet compartment directly to said inlet space; a first consumer conduit leading from said consumer space to said first chamber and a second consumer conduit leading from said second chamber to said consumer, said consumer space being connectable by said opening piston to said load lowering space; and a passage connecting said load lowering space to said third return chamber.

9. A combination as defined in claim 7, wherein said housing is provided with two additionally axially spaced bores aligned along a common axis, and wherein said blocking means comprises an opening piston slidably guided in one of said additional bores and a valve member slidably guided in the other of said additional bores, said other additional bore being provided with a first chamber at the inlet side of said valve member and a second chamber at the outlet side of the latter, said valve member being movable between a starting position in which flow of fluid between said first and said second chamber is prevented and a second position permitting flow of fluid between said chambers, and including spring means biasing said valve member to said starting position, said opening position cooperating with said valve member for moving the latter from said starting to said second position, said pressure channel leading from said outlet compartment about said main slide directly to said first chamber in said other additional bore, a one-way valve in said pressure chamber permitting flow from said outlet compartment to said first chamber while preventing flow in the opposite direction, a consumer passage leading from said second chamber to said consumer, and a passage branching off from said pressure chamber downstream of said one-way valve and leading to said third return chamber about said precontrol slide.

10. A combination as defined in claim 8, and including means between said opening piston and said valve member for limiting the force applied by said opening piston to said valve member during movement of the latter by said opening piston to said second position.

11. A combination as defined in claim 9, and including means between said opening piston and said valve member for limiting the force applied by said opening piston to said valve member during movement of the latter by said opening piston to said second position.

12. A combination as defined in claim 10, wherein said opening piston is formed with a blind bore having an open end facing said valve member, and wherein said force limiting means comprises a spring pressed piston slidably guided in said blind bore and a plunger abutting with opposite ends against said spring pressed piston and said valve member, respectively.

* * * * *